(12) United States Patent
Alkharashi

(10) Patent No.: US 9,208,134 B2
(45) Date of Patent: Dec. 8, 2015

(54) METHODS AND SYSTEMS FOR TOKENIZING MULTILINGUAL TEXTUAL DOCUMENTS

(75) Inventor: Ibrahim Alkharashi, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 1004 days.

(21) Appl. No.: 13/346,981

(22) Filed: Jan. 10, 2012

(65) Prior Publication Data

US 2013/0179147 A1    Jul. 11, 2013

(51) Int. Cl.
*G06F 17/22*    (2006.01)
*G06F 17/27*    (2006.01)

(52) U.S. Cl.
CPC .......... *G06F 17/2217* (2013.01); *G06F 17/275* (2013.01); *G06F 17/277* (2013.01)

(58) Field of Classification Search
CPC ... G06F 17/27; G06F 17/2705; G06F 17/271; G06F 17/272; G06F 17/2755
See application file for complete search history.

(56) References Cited

U.S. PATENT DOCUMENTS

| | | | |
|---|---|---|---|
| 4,758,955 A * | 7/1988 | Chen | 715/257 |
| 4,991,094 A * | 2/1991 | Fagan et al. | 704/9 |
| 5,721,939 A * | 2/1998 | Kaplan | 704/9 |
| 5,890,103 A * | 3/1999 | Carus | 704/9 |
| 5,899,968 A * | 5/1999 | Navarro et al. | 704/220 |
| 5,945,058 A * | 8/1999 | Manners et al. | 264/401 |
| 6,374,242 B1 * | 4/2002 | Childs et al. | |
| 6,845,373 B2 | 1/2005 | Linhart | |
| 7,092,871 B2 * | 8/2006 | Pentheroudakis et al. | 704/9 |
| 7,269,547 B2 | 9/2007 | Pentheroudakis et al. | |
| 7,275,069 B2 | 9/2007 | Hundley et al. | |
| 7,937,263 B2 | 5/2011 | Carrier et al. | |
| 8,180,713 B1 * | 5/2012 | Rigby et al. | 706/12 |
| 2002/0165707 A1 * | 11/2002 | Call | 704/2 |
| 2005/0010564 A1 * | 1/2005 | Metzger et al. | 707/3 |
| 2005/0060651 A1 * | 3/2005 | Anderson | 715/530 |
| 2005/0091031 A1 * | 4/2005 | Powell et al. | 704/4 |
| 2005/0240911 A1 * | 10/2005 | Hundley et al. | 717/142 |
| 2006/0080290 A1 * | 4/2006 | Lombardi | 707/3 |
| 2006/0116862 A1 * | 6/2006 | Carrier et al. | 704/1 |
| 2008/0103757 A1 * | 5/2008 | Washizawa et al. | 704/2 |
| 2008/0140387 A1 * | 6/2008 | Linker | 704/9 |
| 2008/0189097 A1 * | 8/2008 | Burukhin | 704/2 |
| 2009/0070101 A1 * | 3/2009 | Masuyama et al. | 704/9 |
| 2009/0083266 A1 | 3/2009 | Poola et al. | |
| 2009/0187567 A1 * | 7/2009 | Rolle | 707/6 |
| 2009/0204596 A1 * | 8/2009 | Brun et al. | 707/5 |
| 2009/0248392 A1 * | 10/2009 | Talwar et al. | 704/3 |
| 2010/0191825 A1 * | 7/2010 | Yamagishi et al. | 709/217 |
| 2011/0078152 A1 * | 3/2011 | Forman et al. | 707/747 |
| 2011/0078421 A1 * | 3/2011 | Greiner et al. | 712/227 |

* cited by examiner

*Primary Examiner* — Eric Yen
(74) *Attorney, Agent, or Firm* — Andrew M. Calderon; Roberts Mlotkowski Safran & Cole, P.C.

(57) ABSTRACT

Methods and systems for tokenizing multilingual textual documents are provided. A method implemented in a computer infrastructure, includes determining an attribute of a current character in input text, the attribute of the current character indicating one or more classes of characters the current character is assigned thereto. The method further includes determining one or more attributes of one or more next characters in the input text, the one or more attributes of the one or more next characters indicating the one or more classes the one or more next characters are assigned thereto. The method further includes constructing a token of the input text that includes the current character and the one or more next characters, the attribute of the current character and the one or more attributes of the one or more next characters intersecting with each other.

20 Claims, 5 Drawing Sheets

| # | token | # | token | # | token | # | token | # | token |
|---|---|---|---|---|---|---|---|---|---|
| 1 | شالنجر | 15 | مكوك | 29 | 1986 | 43 | . | 57 | Δ |
| 2 | Δ( | 16 | Δ | 30 | Δ | 44 | تسبب | 58 | كانوا |
| 3 | مكوك | 17 | فضائي | 31 | في | 45 | Δ | 59 | Δ |
| 4 |  | 18 | Δ | 32 | Δ | 46 | في | 60 | على |
| 5 | فضاء | 19 | أمريكي | 33 | الجو | 47 | Δ | 61 | Δ |
| 6 | )Δ | 20 | Δ-Δ | 34 | Δ | 48 | مصرع | 62 | متنها |
| 7 | تشالنجر | 21 | انفجر | 35 | بعد | 49 | Δ | | |
| 8 | Δ | 22 | Δ | 36 | Δ | 50 | رواد | | . |
| 9 | Space | 23 | في | 37 | انطلاقها | 51 | Δ99999 | | |
| 10 | Δ | 24 | Δ | 38 | Δ | 52 | الفضاء | | |
| 11 | Shuttle | 25 | 28 | 39 | ب | 53 | Δ | | |
| 12 | Δ | 26 | Δ | 40 | 73 | 54 | السبعة | | |
| 13 | Challenger | 27 | يناير | 41 | Δ | 55 | Δ | | |
| 14 | ،Δ | 28 | Δ | 42 | ثانية | 56 | الذين | | |

FIG. 6

METHODS AND SYSTEMS FOR TOKENIZING MULTILINGUAL TEXTUAL DOCUMENTS

FIELD OF THE INVENTION

The invention relates to textual processing and, more particularly, to methods and systems for tokenizing multilingual textual documents.

BACKGROUND OF THE INVENTION

Textual processing is an important part of human language-based systems. Tokenization is the process of splitting a stream of input text into words, phrases, symbols, or other meaningful elements known as tokens. A list of tokens becomes input for further processing, such as, for example, morphological analyzing, parsing, text mining, indexing, and searching. The process of tokenization is useful both in linguistics for text segmentation and in computer science for lexical analysis before interpretation or compilation.

Programming languages may provide split functions for tokenizing a given string into basic linguistic components. Such split functions may utilize a regular expression (e.g., "regex" or "regexp") which is written in a formal programming language and can be interpreted by a regular expression processor. Some of the programming languages, such as Perl, have fully-integrated regular expressions into the syntax of the languages themselves. Other programming languages, like C, C++, Java, and Python, provide instead access to regular expressions only through libraries.

In the split functions, for example, tokenization may be achieved after identifying a set of separators known as delimiters. In identifying basic language words, delimiters may include whiter spaces and/or punctuation marks. However, using delimiters for tokenization may be overly complicated and inefficient with respect to storage and processing time since input text has to be parsed for each of the delimiters. In addition, current processes for tokenization may not be adapted for use with intermixed input text written in two or more languages.

Accordingly, there exists a need in the art to overcome the deficiencies and limitations described hereinabove.

SUMMARY OF THE INVENTION

In a first aspect of the invention, a method implemented in a computer infrastructure includes determining an attribute of a current character in input text, the attribute of the current character indicating one or more classes of characters the current character is assigned thereto. The method further includes determining one or more attributes of one or more next characters in the input text, the one or more attributes of the one or more next characters indicating the one or more classes the one or more next characters are assigned thereto. The method further includes constructing a token of the input text that includes the current character and the one or more next characters, the attribute of the current character and the one or more attributes of the one or more next characters intersecting with each other.

In another aspect of the invention, a computer program product includes a tangible computer usable storage medium having readable program code embodied in the tangible computer storage medium. The computer program product includes at least one component operable to determine an attribute of a current character in input text, the attribute of the current character indicating one or more classes of characters the current character is assigned thereto. The at least one component is further operable to determine one or more attributes of one or more next characters in the input text, the one or more attributes of the one or more next characters indicating the one or more classes the one or more next characters are assigned thereto. The at least one component is further operable to construct a token of the input text that includes the current character and the one or more next characters, the attribute of the current character and the one or more attributes of the one or more next characters intersecting with each other, and each of the attribute of the current character and the one or more attributes of the one or more next characters including an attribute data structure including a predetermined primitive data type of binary bits.

In yet another aspect of the invention, a computer system for tokenizing multilingual textual documents, includes a CPU, a computer readable memory and a tangible computer readable storage media. The computer system further includes first program instructions to determine an attribute of a current character in input text, the attribute of the current character indicating one or more classes of characters the current character is assigned thereto. Second program instructions determine one or more attributes of one or more next characters in the input text, the one or more attributes of the one or more next characters indicating the one or more classes the one or more next characters are assigned thereto. Third program instructions to perform a Boolean operation on the attribute of the current character and the one or more attributes of the one or more next characters to determine whether the attribute of the current character and the one or more attributes of the one or more next characters intersect with each other. Fourth program instructions construct a token of the input text that includes the current character and the one or more next characters, the attribute of the current character and the one or more attributes of the one or more next characters intersecting with each other, and each of the attribute of the current character and the one or more attributes of the one or more next characters including an attribute data structure including a predetermined primitive data type of binary bits. The first, second, third, and fourth program instructions are stored on the tangible computer readable storage media for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 6 shows an exemplary token list generated based an input text in FIG. 5, in accordance with aspects of the invention.

DETAILED DESCRIPTION OF THE INVENTION

Figure 1:
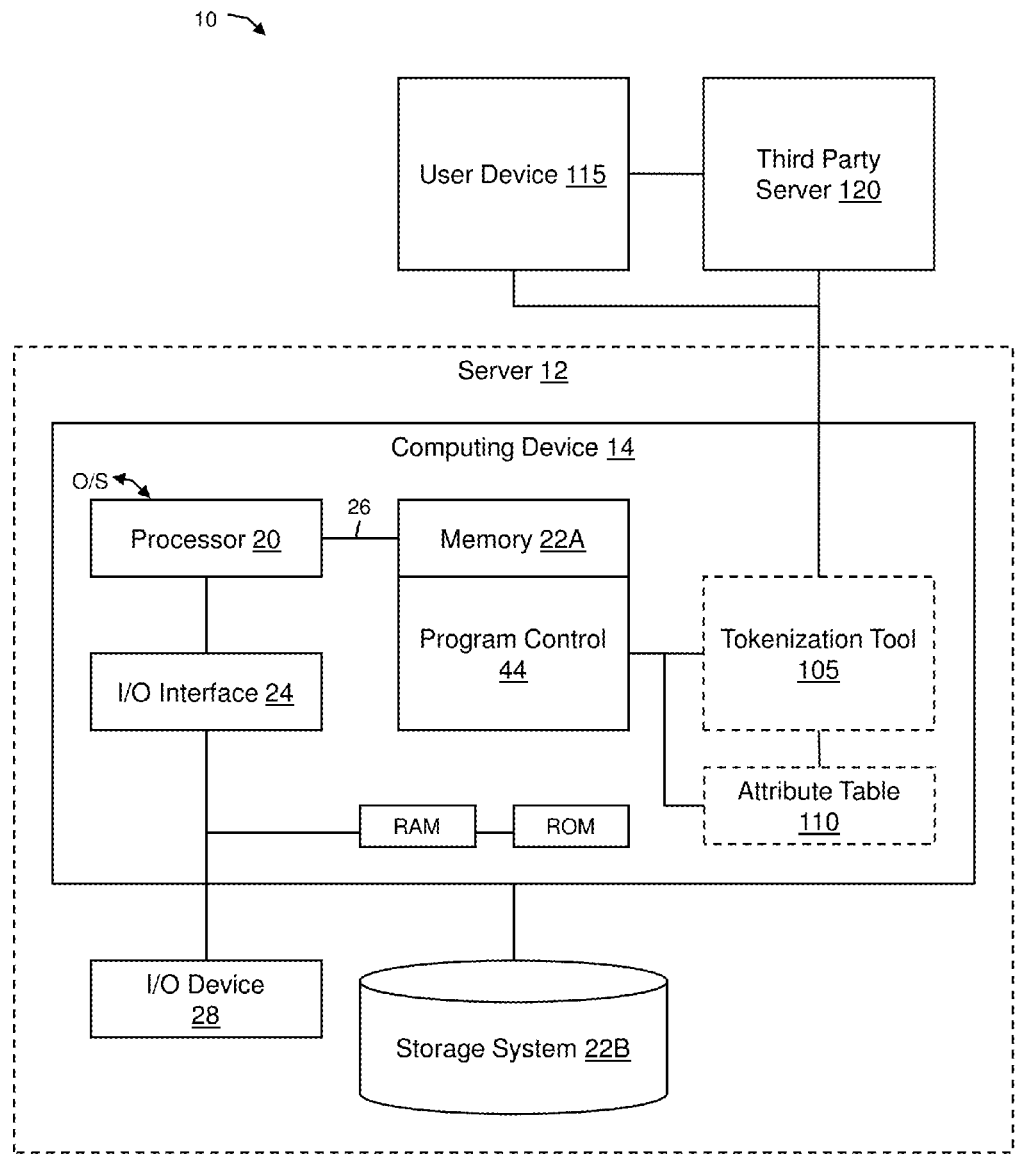
FIG. 1 shows an illustrative environment for implementing steps in accordance with aspects of the invention.

The invention relates to textual processing and, more particularly, to methods and systems for tokenizing multilingual textual documents. More specifically, in embodiments, the present invention is directed to a tokenization tool which can receive input text and tokenize the input text into one or more tokens, e.g., words, phrases, symbols, or other meaningful elements. To accomplish this, the tokenization tool may group characters and/or symbols of one or more particular languages into one or more classes. More specifically, in embodiments, the tokenization tool may assign a given character or symbol of a language to one or more classes by setting an attribute data structure corresponding to the character or symbol.

In embodiments, the present invention includes an attribute table which can initially include one or more predetermined attribute data structures of respective one or more characters or symbols. The tokenization tool may set (e.g., update), store, and/or load the attribute data structures in the attribute table. Once the input text is received, the tokenization tool may add each incoming character and/or symbol of the input text to a current token of the input text when a respective attribute of the incoming character and/or symbol intersects or matches an attribute of a previous character and/or symbol, e.g., when the incoming character is part of a same class of characters as the previous character. That is, the tokenization tool may determine whether each incoming character and/or symbol is part of a current token or represents a start of a new token based on the attribute table, and if so, may construct the current or new token with the incoming character and/or symbol. The tokenization tool can add a constructed token to a token list which includes one or more tokens constructed by the tokenization tool. When the input text does not include any more incoming characters, the tokenization tool may return the token list to a requesting user via, e.g., a user device and/or a third party server, for subsequent textual processing.

Advantageously, by using character attributes, the present invention enables efficient tokenization of input text, even when there is no valid separator or delimiter in the input text. The present invention also simplifies tokenization since the present invention may utilize a smallest primitive data type (e.g., one byte) to describe and group characters and/or symbols, and a single Boolean operation. Moreover, the present invention may allow fast tokenization of multilingual textual documents. The tokenized input text may be used in a wide range of natural language applications, such as, for example, language parsing, text analysis, data mining, text searching, and/or machine translation.

The present invention simplifies the process of tokenizing text whether the text is written in one language or it has an intermixed character set belonging to two or more languages. The present invention achieves the task by comparing an attribute of a coming character against an attribute of a previous character. The process should be very efficient since it only deals with one value that describes a group of characters, and it depends only on a Boolean "AND" operation.

System Environment

The present invention may be embodied as a system, method or computer program product. The present invention may take the form of a hardware embodiment, a software embodiment or a combination of software and hardware.

Furthermore, the present invention may take the form of a computer program product embodied in any tangible storage of expression having computer-usable program code embodied in the medium. The computer-usable or computer-readable medium may be any medium that can contain, store, or communicate, for use by or in connection with the instruction execution system, apparatus, or device. The computer-usable or computer-readable medium may be, for example, an electronic, magnetic, optical, electromagnetic, infrared, or semiconductor system, apparatus, or device.

FIG. 1 shows an illustrative environment 10 for managing the processes in accordance with aspects of the invention. The environment 10 includes a server or other computing system 12 that can perform the processes described herein. The server 12 includes a computing device 14 which can be resident on a network infrastructure or computing device. The computing device 14 includes a processor 20, memory 22A, an I/O interface 24, and a bus 26. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention such as, for example, tokenizing multilingual textual documents, as will be discussed below.

The computing device 14 includes a tokenization tool 105 which can receive input text and tokenize the input text into one or more tokens, e.g., words, phrases, symbols, or other meaningful elements. To accomplish this, the tokenization tool 105 may group characters and/or symbols of one or more particular languages into one or more classes. More specifically, in embodiments, the tokenization tool 105 may assign a given character or symbol of a language to one or more classes. The character or symbol may be assigned to the classes by setting an attribute data structure corresponding to the character or symbol.

Figure 2:
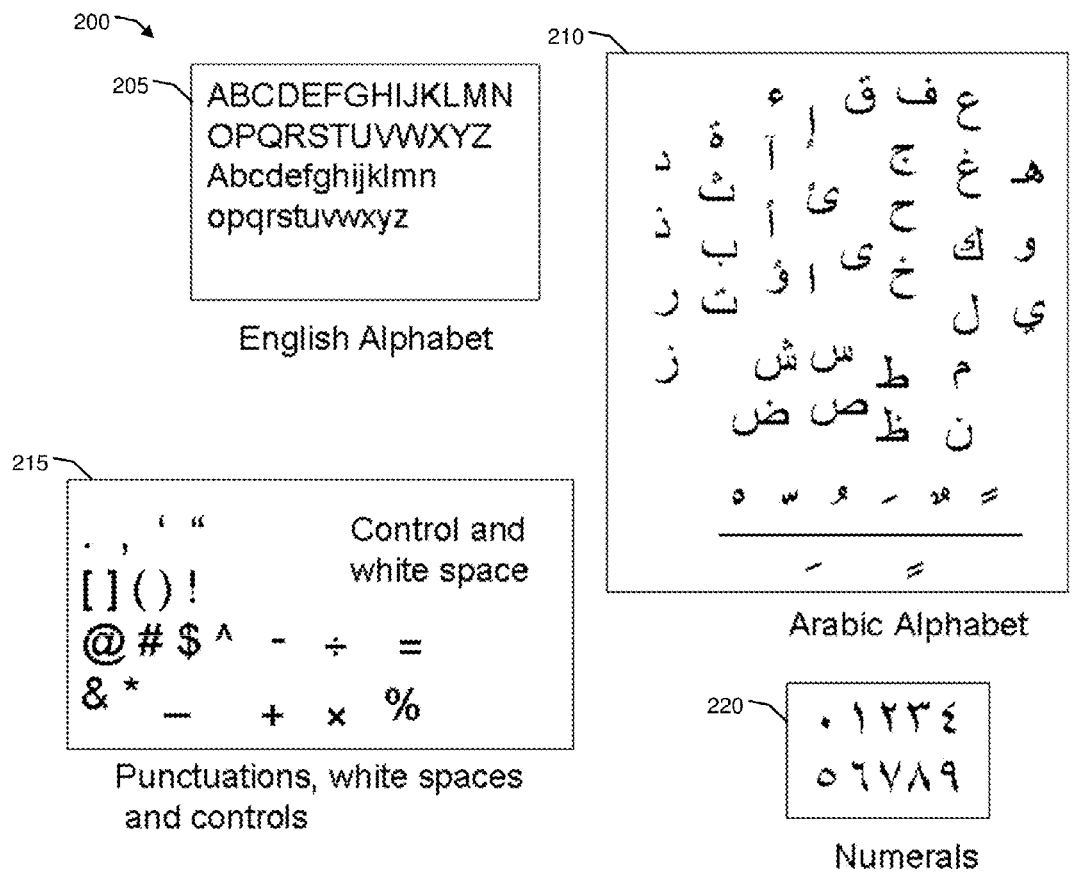
FIG. 2 shows an exemplary plurality of classes including a plurality of characters and/or symbols in accordance with aspects of the invention.

For example, FIG. 2 shows an exemplary plurality of classes 200 including a plurality of characters and/or symbols in accordance with aspects of the invention. In embodiments, the classes 200 can include an English alphabet class 205, an Arabic alphabet class 210, a punctuations, white spaces and controls class 215, and a numerals class 220. The English alphabet class 205 may be assigned with characters of the English alphabet, and the Arabic alphabet class 210 may be assigned with characters of the Arabic alphabet. The punctuations, white spaces and controls class 215 may be assigned with one or more symbols (e.g., punctuations) of any language, and/or with characters and/or symbols of any language in a control and white space located in the class 215. The numerals class 220 may be assigned with numerals of the Arabic alphabet, as shown, and/or numerals of any other language. It should be recognized by one of skill in the art that the classes shown herein are provided as non-limiting, illustrative classes. For example, other language classes are also contemplated by the present invention.

Figure 3:
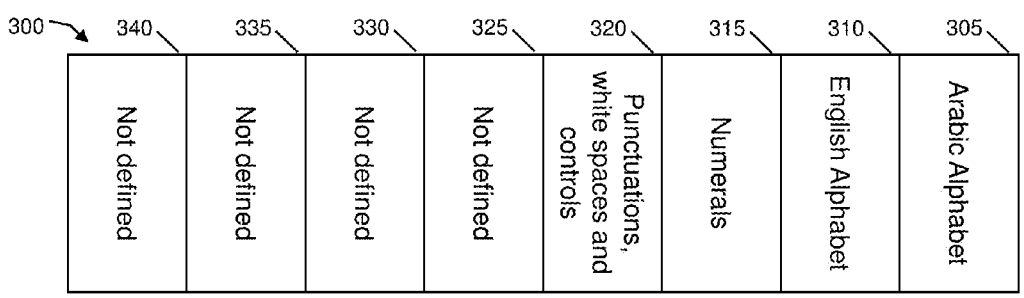
FIG. 3 shows an exemplary attribute data structure of a given character or symbol in accordance with aspects of the invention.

FIG. 3 shows an exemplary attribute data structure 300 of a given character or symbol in accordance with aspects of the invention. To assign the character or symbol to one or more classes of characters and/or symbols, the attribute data structure 300 may be set to indicate that the character or symbol is assigned to the one or more classes. More specifically, in embodiments, the attribute data structure 300 may include a one-byte array (e.g., a smallest primitive data type) of binary bits 305, 310, 315, 320, 325, 330, 335, and 340, although other dimensions are contemplated by the invention. The smallest primitive data type may be predetermined based on a programming language of the tokenization tool 105, and should support bit-based Boolean operations, e.g., an "AND" operation. Each of the binary bits 305-340 may represent an attribute of the corresponding character or symbol that indicates whether the character or symbol is assigned to a respective class of characters and/or symbols.

For example, in embodiments, the binary bit 305 can represent an Arabic alphabet attribute which indicates whether the corresponding character or symbol is assigned to an Arabic alphabet class, e.g., the Arabic alphabet class 210 in FIG. 2. The binary bit 310 may represent an English alphabet attribute which indicates whether the corresponding character or symbol is assigned to an English alphabet class, e.g., the English alphabet class 205 in FIG. 2. The binary bit 315 may represent a numerals attribute which indicates whether the corresponding character or symbol is assigned to a numerals class, e.g., the numerals class 220 in FIG. 2. The binary bit 320 may represent a punctuations, white spaces and controls attribute which indicates whether the corresponding character or symbol is assigned to a punctuations, white spaces and controls class, e.g., the punctuations, white spaces and controls class 215 in FIG. 2. The binary bits 325-340, as shown, may be undefined, but in alternative or additional embodiments, each of the binary bits 325-340 may represent an attribute which indicates whether the corresponding character or symbol is assigned to a respective class of symbols and/or characters. Since the attribute data structure 300 may include the smallest primitive data type, advantageously, the present invention maximizes storage and processing time efficiency in the tokenization process. It should be recognized by those of skill in the art that the attribute data structure 300, and more specifically the one-byte array of the binary bits 305-340, are provided as non-limiting, illustrative examples, where other example are also contemplated by the present invention.

Referring back to FIG. 1, in embodiments, the computing device 14 can include an attribute table 110 which can initially include one or more predetermined attribute data structures of respective one or more characters or symbols. The attribute table 110 may include 256 attribute data structures or bytes, although other dimensions are contemplated by the invention. In preferred embodiments, the attribute table 110 may comprises 256 bytes, at most. The attribute table 110 may be indexed by the characters or symbols, and/or respective codes (e.g., in alphanumeric values from a predetermined codepage) of the characters and/or symbols. The attribute table 110 may be stored in the memory 22A and/or the storage system 22B. The tokenization tool 105 may set (e.g., update), store, and/or load the attribute data structures in the attribute table 110. For example, the tokenization tool 105 may access an attribute data structure of a n-th character by reaching a n-th entry in the attribute table 110, where n is an American Standard Code for Information Interchange (ASCII) value and/or code of the n-th character.

In embodiments, the tokenization tool 105 can receive input text to be tokenized, e.g., from a user via the I/O device 28. In alternative or additional embodiments, the environment 10 may further access information from a user device 115 and/or a third party server 120. The user device 115 may include any type of user device, such as, for example, a smartphone, a laptop computer, a desktop computer, etc. The third party server 120 may provide any type of third party service(s) involving textual documents, such as, for example, a web site, a web store, and/or a database service that may need to parse, analyze, and/or search textual documents. The tokenization tool 105 may receive input text to be tokenized from and/or through the user device 115 and/or the third party server 120. That is, the tokenization tool 105 can provide the tokenization of the input text as a service to the user device 115 and/or the third party server 120.

Figure 4:
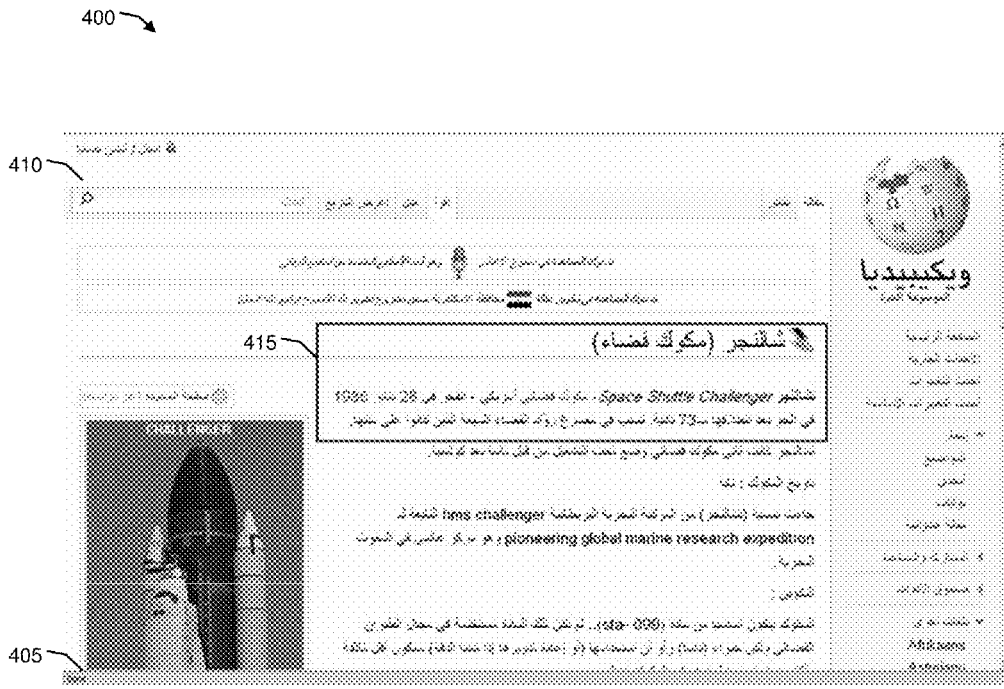
FIG. 4 shows an exemplary screenshot of a web browser in accordance with aspects of the invention.

For example, FIG. 4 shows an exemplary screenshot 400 of a web browser 405 in accordance with aspects of the invention. In embodiments, the web browser 405 can be displayed to a user via a user device, e.g., the user device 115 in FIG. 1. The web browser 405 may include a web page 410 provided by a third party service, e.g., of a third party server 120 in FIG. 1. A portion 415 of the web page 410 may include bilingual input text which may be tokenized. The web browser 405 (via the user device) may send the portion 415 as input text to be tokenized, to a tokenization tool of the present invention, e.g., the tokenization tool 105 in FIG. 1.

Figure 5:
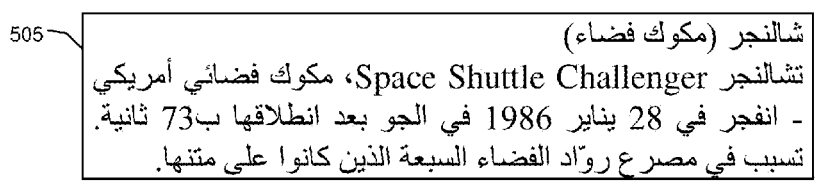
FIG. 5 shows exemplary input text from the web browser in FIG. 4 that may be tokenized in accordance with aspects of the invention.

FIG. 5 shows exemplary input text 505 from the web browser 405 in FIG. 4 that may be tokenized in accordance with aspects of the invention. More specifically, in embodiments, the web browser may send the portion 415 of the web page 410, in FIG. 4, as the input text 505 to be tokenized, to the tokenization tool 105 in FIG. 1. The input text 505 may include bilingual input text, e.g., characters and/or symbols from both the Arabic and English alphabets, as shown.

Referring back to FIG. 1, in embodiments, once the input text is received, the tokenization tool 105 can covert the input text into an array of codes of characters and/or symbols based on whether the programming language (e.g., Java) of the tokenization tool 105 requires conversion. Each of the codes may include an alphanumerical value (e.g., "A2"), from a predetermined codepage, that represents a respective character or symbol (e.g., "¢"). The tokenization tool 105 may add each incoming character and/or symbol of the input text to a current token of the input text when a respective attribute of the incoming character and/or symbol intersects or matches an attribute of a previous character and/or symbol, e.g., when the incoming character is part of a same class of characters as the previous character. That is, the tokenization tool 105 may determine whether each incoming character and/or symbol is part of a current token or represents a start of a new token based on the attribute table 110.

More specifically, in embodiments, the tokenization tool 105 can determine an attribute of a current character (ACC) or a first character that includes an attribute data structure of the current character, in the attribute table 110. The ACC is a reference for incoming characters and whether these incoming characters include intersecting attributes as the ACC. The tokenization tool 105 may determine whether the input text includes more incoming characters by, e.g., moving one step into the array of codes. If so, the tokenization tool 105 may determine an attribute of a next character (ANC) which includes an attribute data structure of the incoming next character, in the attribute table 110. The tokenization tool 105 may perform a Boolean "AND" operation (e.g., "&") on the ACC and the ANC to determine whether the ACC and the ANC intersect (e.g., a resulting value is greater than zero) or do not intersect (e.g., the resulting value is equal to zero). That is, based on the "AND" operation on their attributes, the tokenization tool 105 may determine whether the current character and the next character are part of a same class of characters.

In embodiments, when the ACC and the ANC intersect, the tokenization tool 105 can add the next character to a token buffer. The token buffer may be implemented in, for example, the memory 22A and/or the storage system 22B. The tokenization tool 105 may use one or more characters in the token buffer to construct a token of the input text, and the next character is added to the token buffer since, based on the ACC and the ANC intersecting, the next character is part of the token to be constructed. Upon adding the next character to the token buffer, the tokenization tool 105 may determine whether the input text includes more incoming characters for constructing tokens.

In accordance with further aspects of the invention, when the ACC and the ANC do not intersect, the tokenization tool 105 can construct a token of the input text based on the token buffer, e.g., to include the characters added to the token buffer. The next character is not added to the current characters in the token buffer since based on the ACC and the ANC not intersecting, the next character represents a start of a new token to be constructed. The tokenization tool 105 may add the constructed token to a token list which includes one or more tokens constructed by the tokenization tool 105. The tokenization tool 105 may empty the token buffer, and may add the next character to the token buffer that represents the start of the new token to be constructed. The tokenization tool 105 may set the ACC to the ANC, e.g., assign the ANC as the reference for incoming characters. Upon adding the next character to the token buffer, the tokenization tool 105 may determine whether the input text includes more incoming characters for constructing tokens. When the input text does not include any more incoming characters, the tokenization tool 105 may construct a last token of the input text based on the token buffer, add the last token to the token list, and return the token list to a requesting user via, e.g., the I/O device 28, the user device 115, and/or the third party server 120.

Advantageously, by using character attributes, the present invention enables fast tokenization of input text, even when there is no valid separator or delimiter in the input text. The present invention also simplifies and makes more efficient the process of tokenization since the present invention may utilize a smallest primitive data type to describe and group characters and/or symbols, and a single Boolean "AND" operation. Further, the present invention may allow fast and efficient tokenization of input text including an intermixed character set which belongs to two or more languages, e.g., multilingual textual documents. The tokenized input text may be used in a wide range of natural language applications, such as, for example, language parsing, text analysis, data mining, text searching, and/or machine translation. The present invention may also be part of systems, such as, for example, compilers, machine translation systems, search engines, and/or data mining applications.

FIG. 6 shows an exemplary token list 605 generated based the input text 505 in FIG. 5 in accordance with aspects of the invention. The token list 605 includes 62 tokens generated by the tokenization tool of the present invention, e.g., the tokenization tool 105 in FIG. 1. The token list 605 is indexed by a token number ("#"). Each of the generated tokens includes characters and/or symbols of a single class of characters and/or symbols. For example, a first token (e.g., token number 1) includes characters of an Arabic alphabet class (e.g., the Arabic alphabet class 210 in FIG. 2). A symbol "Δ" denotes a white space of the input text that is part of a punctuations, white spaces and controls class, e.g., the punctuations, white spaces and controls class 215 in FIG. 2.

Figure 7:
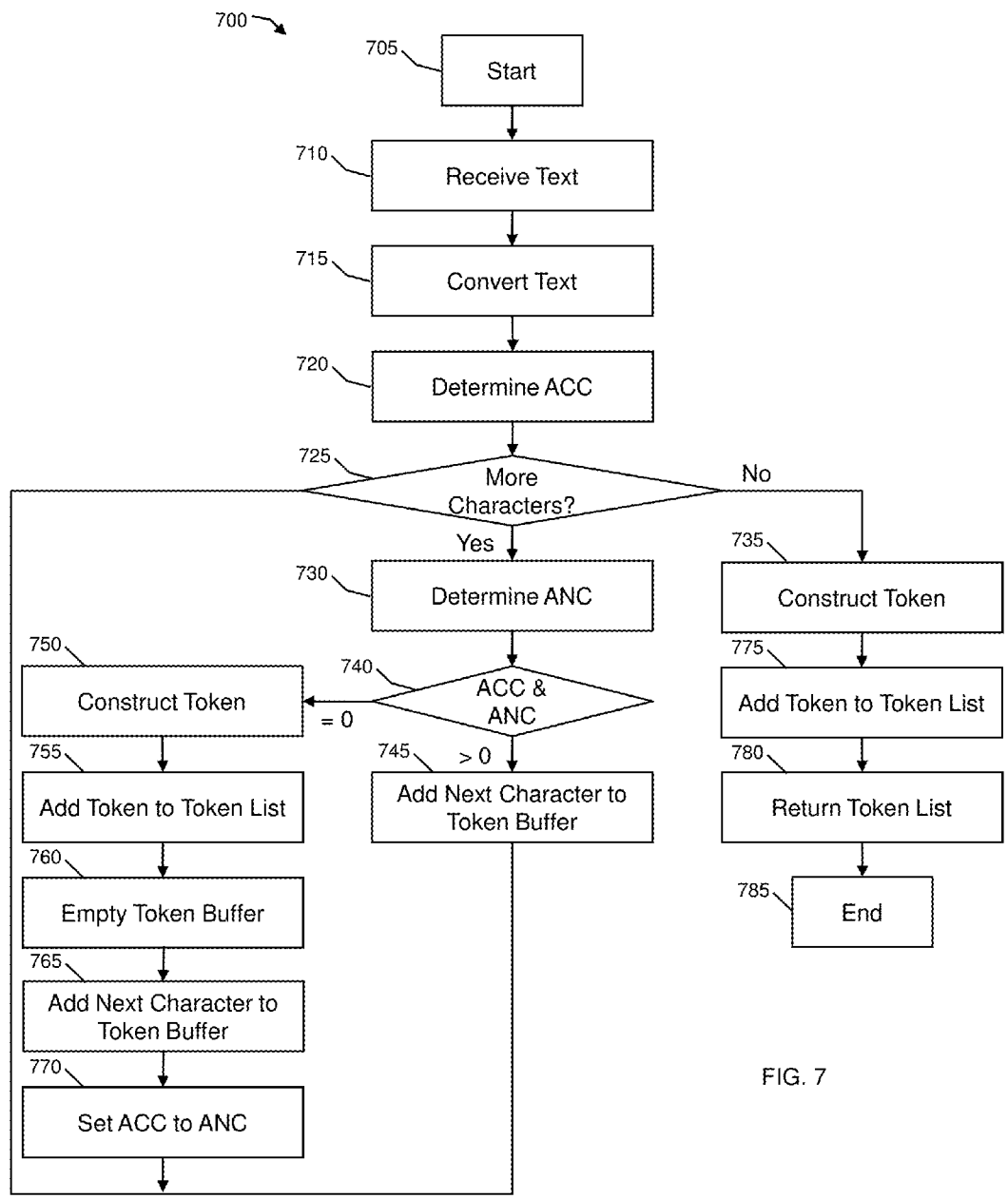
FIG. 7 shows an exemplary flow diagram implementing processes in accordance with aspects of the invention.

FIG. 7 shows an exemplary flow diagram implementing a process 700 in accordance with aspects of the invention. The flow diagram may equally represent a high-level block diagram or a swim-lane diagram of the invention. The steps of the flow diagram may be implemented and executed from either a server, in a client server relationship, or they may run on a user workstation with operative information conveyed to the user workstation. Furthermore, the invention can take the form of a computer program product accessible from a computer-usable or computer-readable medium providing program code for use by or in connection with a computer or any instruction execution system. The software and/or computer program product can be implemented in the environment of FIG. 1.

As shown in FIG. 7, at step 705, the process of the invention begins. At step 710, input text is received that is eventually tokenized into one or more tokens, e.g., words, phrases, symbols, or other meaningful elements. At step 715, the input text is converted into an array of codes of characters and/or symbols. Each of the codes may include an alphanumerical value (e.g., "A2"), from a predetermined codepage, that represents a respective character or symbol (e.g., "¢"). At step 720, an attribute of a current character (ACC) or a first character is determined that includes an attribute data structure of the current character, in an attribute table, e.g., the attribute table 110 in FIG. 1. The ACC is a reference for incoming characters and whether these incoming characters include intersecting attributes as the ACC.

At step 725, the process determines whether the input text includes more incoming characters by, e.g., moving one step into the array of codes. If so, the process continues at step 730. Otherwise, the process continues at step 735. At step 730, an attribute of a next character (ANC) is determined that includes an attribute data structure of the incoming next character, in the attribute table.

At step 740, a Boolean "AND" operation (e.g., "&") is performed on the ACC and the ANC, and the process determines whether the ACC and the ANC intersect (e.g., a resulting value is greater than zero) or do not intersect (e.g., the resulting value is equal to zero). That is, based on the "AND" operation on their attributes, the process determines whether the current character and the next character are part of a same class of characters. If so, the process continues at step 745. Otherwise, the process continues at step 750.

At step 745, the next character is added to a token buffer. The process can use one or more characters in the token buffer to construct a token of the input text. The next character is added to the token buffer since based on the ACC and the ANC intersecting, the next character is part of the token to be constructed. The process returns to step 725.

At step 750, a token of the input text is constructed based on the token buffer, e.g., to include the characters added to the token buffer. The next character is not added to the current characters in the token buffer since based on the ACC and the ANC not intersecting, the next character represents a start of a new token to be constructed. At step 755, the constructed token is added to a token list which includes one or more tokens constructed by the process. At step 760, the token buffer is emptied.

At step 765, the next character is added to the emptied token buffer that represents the start of the new token to be constructed. At step 770, the ACC is set to the ANC, e.g., the ANC is assign as the reference for incoming characters. The process continues at step 725. When the input text does not include any more incoming characters, at step 735, a last token of the input text is constructed. At step 775, the constructed last token is added to the token list. At step 780, the token list is returned to a requesting user via, e.g., a user device and/or a third party server, and for further language processing. The process ends at step 785.

The foregoing examples have been provided for the purpose of explanation and should not be construed as limiting the present invention. While the present invention has been described with reference to an exemplary embodiment. Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method implemented in a computer infrastructure, comprising:
    determining an attribute of a current character in input text, the attribute of the current character indicating one or more classes of characters the current character is assigned thereto;
    determining one or more attributes of one or more next characters in the input text, the one or more attributes of the one or more next characters indicating the one or more classes the one or more next characters are assigned thereto; and
    constructing a token of the input text that comprises the current character and the one or more next characters, the attribute of the current character and the one or more attributes of the one or more next characters intersecting with each other,
    wherein the attribute of the current character and the one or more attributes of the one or more next characters comprises an attribute data structure which comprises a one-byte array, and
    wherein the one-byte array comprises a plurality of binary bits and each bit of the binary bits indicates a different class from remaining bits of the binary bits.

2. The method of claim 1, further comprising setting the attribute data structure of the current character and the one or more next characters, to assign the current character and the one or more next characters to the one or more classes.

3. The method of claim 1, wherein the attribute of the current character and the one or more attributes of the one or more next characters is stored in an attribute table indexed by at least one of characters in the input text and codes of the characters in the input text.

4. The method of claim 1, further comprising receiving the input text from at least one of a local component of the computer infrastructure, a user device, and a third party server.

5. The method of claim 1, wherein the one or more classes comprise:
    a first alphabet class corresponding to a first language alphabet;
    a second alphabet class corresponding to a second language alphabet different from the first language alphabet;
    a punctuations, white spaces and controls class; and
    a numerals class.

6. The method of claim 5, wherein the first language alphabet is English characters and the second language alphabet is Arabic characters.

7. The method of claim 1, further comprising performing a Boolean operation on the attribute of the current character and the one or more attributes of the one or more next characters to determine whether the attribute of the current character and the one or more attributes of the one or more next characters intersect with each other.

8. The method of claim 1, further comprising adding the one or more next characters to a token buffer, the constructing of the token being based on the token buffer.

9. The method of claim 8, further comprising:
    determining an attribute of a next character in the input text, the attribute of the next character indicating the one or more classes the next character is assigned thereto;
    emptying the token buffer after the constructing of the token;
    adding the next character to the token buffer, the attribute of the current character and the attribute of the next character not intersecting with each other;
    setting the attribute of the current character to the attribute of the next character; and
    constructing another token of the input text that comprises the next character based on the token buffer.

10. The method of claim 1, further comprising:
    adding the constructed token to a token list comprising one or more tokens of the input text; and
    returning the token list to at least one of a local component of the computer infrastructure, a user device, and a third party server.

11. A computer program product comprising a non-transitory tangible computer usable storage medium having readable program code embodied in the non-transitory tangible computer usable storage medium, the computer program product includes at least one component operable to:
    determine an attribute of a current character in input text, the attribute of the current character indicating one or more classes of characters the current character is assigned thereto;
    determine one or more attributes of one or more next characters in the input text, the one or more attributes of the one or more next characters indicating the one or more classes the one or more next characters are assigned thereto; and
    construct a token of the input text that comprises the current character and the one or more next characters, the attribute of the current character and the one or more attributes of the one or more next characters intersecting with each other, and the attribute of the current character and the one or more attributes of the one or more next characters comprising an attribute data structure which comprises a one-byte array,
    wherein the one-byte array comprises a plurality of binary bits and each bit of the binary bits indicates a different class from remaining bits of the binary bits.

12. The computer program product of claim 11, wherein the at least one component is further operable to set the attribute data structure of the current character and the one or more next characters, to assign the current character and the one or more next characters to the one or more classes.

13. The computer program product of claim 11, wherein the attribute of the current character and the one or more attributes of the one or more next characters is stored in an attribute table indexed by at least one of characters in the input text and codes of the characters in the input text.

14. The computer program product of claim 11, wherein the at least one component is further operable to receive the input text from at least one of a local component of the computer program product, a user device, and a third party server.

15. The computer program product of claim 11, wherein the one or more classes comprise:

a first alphabet class corresponding to a first language alphabet;

a second alphabet class corresponding to a second language alphabet different from the first language alphabet;

a punctuations, white spaces and controls class; and a numerals class.

16. The computer program product of claim 11, wherein the at least one component is further operable to perform a Boolean operation on the attribute of the current character and the one or more attributes of the one or more next characters to determine whether the attribute of the current character and the one or more attributes of the one or more next characters intersect with each other.

17. The computer program product of claim 11, wherein the at least one component is further operable to add the one or more next characters to a token buffer, the constructing of the token being based on the token buffer.

18. The computer program product of claim 11, wherein the at least one component is further operable to:

add the constructed token to a token list comprising one or more tokens of the input text; and return the token list to at least one of a local component of the computer program product, a user device, and a third party server.

19. A computer system for tokenizing multilingual textual documents, the system comprising:

a CPU, a computer readable memory and a tangible computer readable storage media;

first program instructions to determine an attribute of a current character in input text, the attribute of the current character indicating one or more classes of characters the current character is assigned thereto;

second program instructions to determine one or more attributes of one or more next characters in the input text, the one or more attributes of the one or more next characters indicating the one or more classes the one or more next characters are assigned thereto;

third program instructions to perform a Boolean operation on the attribute of the current character and the one or more attributes of the one or more next characters to determine whether the attribute of the current character and the one or more attributes of the one or more next characters intersect with each other; and fourth program instructions to construct a token of the input text that comprises the current character and the one or more next characters, the attribute of the current character and the one or more attributes of the one or more next characters intersecting with each other, and the attribute of the current character and the one or more attributes of the one or more next characters comprising an attribute data structure which comprises a one-byte array, wherein the one-byte array comprises a plurality of binary bits and each bit of the binary bits indicates a different class from remaining bits of the binary bits, and wherein the first, second, third, and fourth program instructions are stored on the tangible computer readable storage media for execution by the CPU via the computer readable memory.

20. The computer system of claim 19, wherein the attribute of the current character and the one or more attributes of the one or more next characters is stored in an attribute table indexed by at least one of characters in the input text and codes of the characters in the input text.

* * * * *